United States Patent
Aoki

(10) Patent No.: US 8,000,599 B2
(45) Date of Patent: Aug. 16, 2011

(54) OPTICAL TRANSMISSION SYSTEM AND OPTICAL TRANSMISSION METHOD

(75) Inventor: Yasuhiko Aoki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 691 days.

(21) Appl. No.: 12/002,775

(22) Filed: Dec. 19, 2007

(65) Prior Publication Data

US 2008/0205889 A1    Aug. 28, 2008

(30) Foreign Application Priority Data

Feb. 28, 2007 (JP) ................................ 2007-050365

(51) Int. Cl.
*H04B 10/00* (2006.01)
(52) U.S. Cl. .................. 398/25; 398/30; 398/51
(58) Field of Classification Search ......... 398/158–161, 398/51, 25–34
See application file for complete search history.

(56) References Cited

U.S. PATENT DOCUMENTS

| | | | | |
|---|---|---|---|---|
| 4,912,706 A * | 3/1990 | Eisenberg et al. | ............ | 370/507 |
| 6,973,270 B2 * | 12/2005 | Yokoyama et al. | ............. | 398/57 |
| 7,512,339 B2 * | 3/2009 | Shimizu et al. | ................. | 398/53 |
| 7,751,708 B2 * | 7/2010 | Aoki | ............................... | 398/54 |
| 2006/0222361 A1 | 10/2006 | Aoki | | |
| 2007/0166035 A1 | 7/2007 | Aoki | | |
| 2008/0159748 A1 * | 7/2008 | Sone et al. | .................... | 398/154 |
| 2008/0175590 A1 * | 7/2008 | Perkins et al. | .................. | 398/58 |

FOREIGN PATENT DOCUMENTS

| | | |
|---|---|---|
| JP | 2005-136951 A | 5/2005 |
| JP | 2006-279362 | 10/2006 |
| JP | 2007-189326 | 7/2007 |

OTHER PUBLICATIONS

"Japanese Office Action", Decision of patent grant mailed by JPO and corresponding to Japanese application No. 2007-050365 on May 24, 2011, with English translation.

* cited by examiner

*Primary Examiner* — Agustin Bello
(74) *Attorney, Agent, or Firm* — Fujitsu Patent Center

(57) ABSTRACT

In an optical transmission system, a transmitting transceiving node generates a multiplexed optical-packet signal by performing optical wavelength multiplexing on a plurality of optical packets, and transmits the multiplexed optical-packet signal to a receiving transceiving node. The receiving transceiving node transmits the multiplexed optical-packet signal back to the transmitting transceiving node. The transmitting transceiving node detects a skew amount of the optical packet allocated to each wavelength band of the multiplexed optical-packet signal received from the receiving transceiving node, and adjusts a delay amount of the optical packet based on the detected skew amount.

14 Claims, 11 Drawing Sheets

FIG.3

QUEUE DATA

| DESTINATION-NODE IDENTIFICATION DATA | DESTINATION ADDRESS | TRANSMISSION DATA |
|---|---|---|
| NODE 1 | ○○○○ | TRANSMISSION DATA TO BE TRANSMITTED TO NODE 1 |
| NODE 2 | ○○○○ | TRANSMISSION DATA TO BE TRANSMITTED TO NODE 2 |
| ⋮ | ⋮ | ⋮ |
| NODE N | ○○○○ | TRANSMISSION DATA TO BE TRANSMITTED TO NODE N |

FIG.5

MANAGEMENT DATA

| DESTINATION-NODE IDENTIFICATION DATA | WAVE-LENGTH 1 | WAVE-LENGTH 2 | WAVE-LENGTH 3 | WAVE-LENGTH 4 |
|---|---|---|---|---|
| NODE 1 | 0 ns | 10 ns | 20 ns | 15 ns |
| NODE 2 | 20 ns | 0 ns | 10 ns | 5 ns |
| ⋮ | ⋮ | ⋮ | ⋮ | ⋮ |
| NODE N | 0 ns | 0 ns | 10 ns | 15 ns |

OPTICAL TRANSMISSION SYSTEM AND OPTICAL TRANSMISSION METHOD

BACKGROUND OF THE INVENTION

1. Field of the Invention

The present invention relates to an optical transmission system and an optical transmission method for performing optical transmission over an optical switching network, and more particularly, to an optical transmission system and an optical transmission method that can perform correction of skew that can occur in wavelength-multiplexed signals.

2. Description of the Related Art

Adaptation of optical interconnects is under review for interconnect systems of parallel computers such as supercomputers and signal switching in high-speed routers to avoid bottleneck (in terms of band and physical amount, for example) in electric wiring technology. The optical interconnect utilizes the broadband property of optical transmission technology. The optical interconnect is a generic term for optical data communication of extremely short distance. In general, the optical interconnect means optical communication of a distance shorter than a Local Area Network (LAN).

Many of optical interconnect systems introduced until now adopt switching techniques in which optical signals are once converted to electrical signals for switching. With this configuration, however, broadening of the bandwidth entails increase in the number of switching ports, and increase in the scale of switching itself. Accordingly, attempts are being made to realize optical packet switches which perform switching directly on optical signals.

On the other hand, a system for time-multiplexing optical packet/burst signals in an optical region is utilized in Passive Optical Network (PON) technology which is introduced as an optical system for subscriber system. This time-multiplexing system is introduced into a system which transmits the optical packet/burst signals in timeslots assigned to respective subscribers and terminates at the side of a communication station.

However, when signals are switched and merged in the optical region, the absence of a buffer element (delay element) which can hold the optical signals as they are causes skew to occur in the optical packets arriving at the input ports of the switch and the merging unit. As a result, a guard period allocated between transmitted packets increases. Since no information is transmitted during the guard period, the increase in guard period adversely affects optical packet transmission efficiency significantly.

To prevent the increase in guard period, Japanese Patent Application Laid-Open No. 2006-279362 proposes a technique according to which a time difference is corrected by detecting synchronization of a looped back optical dummy packet after a switching process at an optical switch node and varying the readout time until synchronization is achieved.

However, when an optical packet signal in which signals of different wavelengths are multiplexed is used in the interconnect system using the optical packet switching described above to efficiently increase the band, a skew occurs in the wavelength-multiplexed signal before it arrives at a destination node.

SUMMARY OF THE INVENTION

It is an object of the present invention to at least partially solve the problems in the conventional technology.

According to one aspect of the present invention, an optical transmission system that performs optical transmission over an optical switching network, includes an optical wavelength-multiplexing unit that generates a multiplexed optical-packet signal by performing optical wavelength multiplexing on a plurality of optical packets, and transmits the multiplexed optical-packet signal to a transmission destination, a retransmitting unit that retransmits the multiplexed optical-packet signal transmitted from the optical wavelength-multiplexing unit back to a transmission source, a skew-amount detecting unit that detects a skew amount of the optical packet allocated to each wavelength band of the multiplexed optical-packet signal retransmitted from the retransmitting unit, and a delay-amount adjusting unit that adjusts, based on the skew amount detected by the skew-amount detecting unit, a delay amount of an optical packet allocated to each wavelength band of a multiplexed optical-packet signal transmitted to a transmission destination by the optical wavelength-multiplexing unit.

According to another aspect of the present invention, an optical transmission system that performs optical transmission over an optical switching network, includes an optical wavelength-multiplexing unit that generates a multiplexed optical-packet signal by performing optical wavelength multiplexing on a plurality of optical packets, and transmits the multiplexed optical-packet signal to a transmission destination, a skew-amount detecting unit that detects a skew amount of each of the optical packets allocated to wavelength bands of the multiplexed optical-packet signal transmitted from the optical wavelength-multiplexing unit, a skew control unit that manages the skew amount detected by the skew-amount detecting unit, and transmits the skew amount to a transmission source of the multiplexed optical-packet signal based on a traffic amount in the optical switching network, and a delay amount adjusting unit that adjusts, based on the skew amount transmitted from the skew control unit, a delay amount of an optical packet allocated to each wavelength band of a multiplexed optical-packet signal transmitted to a transmission destination by the optical wavelength-multiplexing unit.

According to still another aspect of the present invention, an optical transmission method of an optical transmission system that performs optical transmission over an optical switching network between a transmission source node and a transmission destination node, includes optical wavelength-multiplexing in which the transmission source node generates a multiplexed optical-packet signal by performing optical wavelength multiplexing on a plurality of optical packets, and transmits the multiplexed optical-packet signal to the transmission destination node, retransmitting in which the transmission destination node retransmits the multiplexed optical-packet signal transmitted in the optical wavelength-multiplexing back to the transmission source node, skew-amount detecting in which the transmission source node detects a skew amount of the optical packet allocated to each wavelength band of the multiplexed optical-packet signal retransmitted in the retransmitting, and delay-amount adjusting in which the transmission source node adjusts, based on the skew amount detected in the skew-amount detecting, a delay amount of an optical packet allocated to each wavelength band of a multiplexed optical-packet signal transmitted to the transmission destination node.

According to still another aspect of the present invention, an optical transmission method of an optical transmission system that performs optical transmission over an optical switching network between a transmission source node and a transmission destination node, includes optical wavelength-multiplexing in which the transmission source node generates a multiplexed optical-packet signal by performing optical wavelength multiplexing on a plurality of optical packets, and transmits the multiplexed optical-packet signal to the transmission destination node, skew-amount detecting in which the transmission destination node detects a skew amount of each of the optical packets allocated to wavelength bands of the multiplexed optical-packet signal transmitted in the optical wavelength-multiplexing, skew controlling in which a management node that manages the skew amount detected in the skew-amount detecting transmits the skew amount to the transmission source node of the multiplexed optical-packet signal based on a traffic amount in the optical switching network, and delay amount adjusting in which the transmission source node adjusts, based on the skew amount transmitted from the management node, a delay amount of an optical packet allocated to each wavelength band of a multiplexed optical-packet signal transmitted to the transmission destination node in the optical wavelength-multiplexing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of a data structure of queue data stored in a data queuing memory;

FIG. 5 is a diagram of an example of a data structure of management data according to the first embodiment;

DETAILED DESCRIPTION OF THE PREFERRED EMBODIMENTS

Exemplary embodiments of an optical transmission system and an optical transmission method according to the present invention are described in detail below with reference to the accompanying drawings.

An overview and a salient feature of an optical transmission system according to a first embodiment are explained first. The optical transmission system according to the first embodiment performs optical transmission over an optical switching network of optical switches, in which a node on the transmitting side (hereinafter, "transmitting node") performs optical wavelength multiplexing on a plurality of optical packets to generate a multiplexed optical-packet signal, and transmits the multiplexed optical-packet signal to a node on the receiving side (hereinafter, "receiving node").

The receiving node returns the multiplexed optical-packet signal sent from the transmitting node back to the transmitting node. The transmitting node then detects a skew amount of each optical packet allocated to each wavelength band of the multiplexed optical-packet signal sent from the receiving node, and adjusts a delay amount of each optical packet allocated to each wavelength band of a multiplexed optical-packet signal to be sent to the receiving node based on the detected skew amount.

Thus, the optical transmission system according to the first embodiment can correct the skew that occurs in the multiplexed optical-packet signal during transmission by adjusting the delay amount of each optical packet of the multiplexed optical-packet signal transmitted from the transmitting node to the receiving node based on the skew amount of each optical packet subjected to the optical wavelength multiplexing.

As the optical transmission system according to the first embodiment can correct the skew that occurs in the multiplexed optical-packet signal during transmission, the bands can be increased through the wavelength multiplexing technology. Further, the optical transmission system according to the first embodiment is capable of correcting the skew occurs in multiplexed optical-packet signal transmitted over any channel, thereby improving network utilization efficiency.

Figure 1:
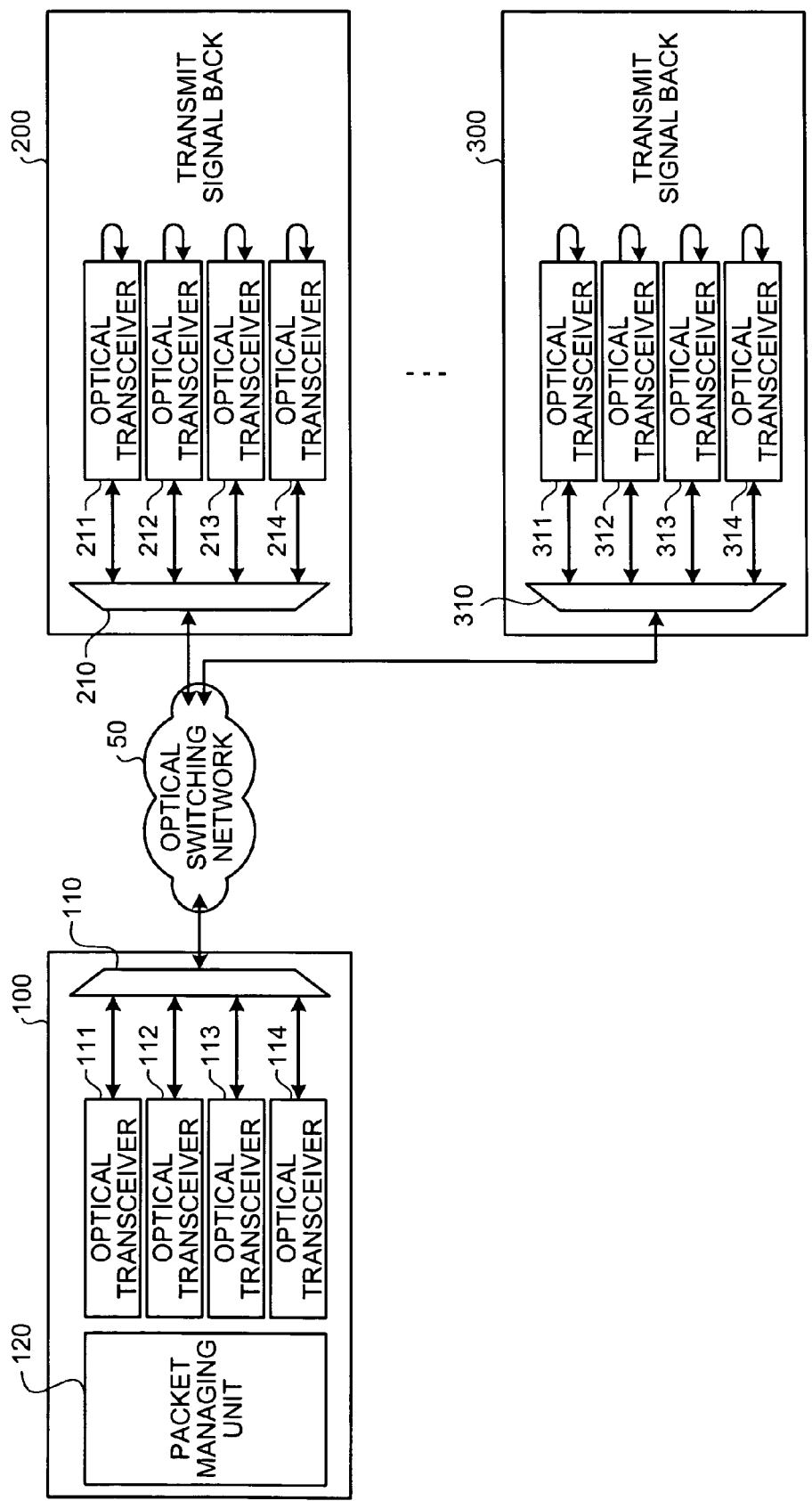
FIG. 1 is a diagram of a configuration of an optical transmission system according to a first embodiment of the present invention.

A configuration of the optical transmission system according to the first embodiment is described below. FIG. 1 is a diagram of the configuration of the optical transmission system according to the first embodiment. As shown in FIG. 1, the optical transmission system according to the first embodiment includes transceiving nodes 100 to 300, each of which is connected to an optical switching network 50.

The optical switching network 50 is a communication network that includes a microelectromechanical system (MEMS) type switch, or an optical switch using a semiconductor optical amplifier (SOA), or an optical switch using a ferroelectric substance such as lithium niobate (LiNbO3).

The transceiving nodes 100 to 300 are devices among which data communication (through exchange of multiplexed optical-packet signals) takes place. For the sake of convenience, it is supposed in the first embodiment that multiplexed optical-packet signals are transmitted from the transceiving node 100 to the transceiving nodes 200 and 300.

Rough configurations of the transceiving nodes 100 to 300 are described below. As shown in FIG. 1, the transceiving node 100 includes a wavelength multiplexing-demultiplexing filter 110, optical transceivers 111 to 114, and a packet managing unit 120.

The wavelength multiplexing-demultiplexing filter 110 performs optical wavelength multiplexing (wavelength division multiplexing (WDM)) on each of the optical packets received from the optical transceivers 111 to 114 to generate a multiplexed optical-packet signal and transmits the multiplexed optical-packet signal to a destination transceiving node. Upon receiving the multiplexed optical-packet signal over the optical switching network 50, the wavelength multiplexing-demultiplexing filter 110 demultiplexes the multiplexed optical-packet signal into optical packets allocated to respective wavelength bands, and outputs the demultiplexed optical packets to the optical transceivers 111 to 114.

The optical transceivers 111 to 114 convert packets received from the packet managing unit 120 into optical packets and output the optical packets to the wavelength multiplexing-demultiplexing filter 110. Upon receiving the optical packets from the wavelength multiplexing-demultiplexing filter 110, the optical transceivers 111 to 114 convert the optical packets to electrical signals and output the packets converted to electrical signals to the packet managing unit 120.

The packet managing unit 120 creates packets (that are later converted to optical packets) and outputs them to the optical transceivers 111 to 114. Upon receiving a multiplexed optical-packet signal returned by a destination transceiving node, the packet managing unit 120 detects a skew amount of each optical packet (optical packet allocated to each wavelength band) based on packets allocated to respective wavelength bands of the multiplexed optical-packet signal. The packet managing unit 120 further adjusts the delay amount of each optical packet based on the skew amount.

The transceiving node 200 includes a wavelength multiplexing-demultiplexing filter 210 and optical transceivers 211 to 214. The transceiving node 200 also includes a packet managing unit, which is functionally identical to the packet managing unit 120 of the transceiving node 100. Hence, the description thereof is omitted.

The wavelength multiplexing-demultiplexing filter 210 demultiplexes the multiplexed optical-packet signal received from the transceiving node 100 into optical packets allocated to respective wavelength bands of the multiplexed optical-packet signal, and outputs the demultiplexed optical packets to the optical transceivers 211 to 214. Upon receiving the optical packets from the optical transceivers 211 to 214, the wavelength multiplexing-demultiplexing filter 210 performs optical wavelength multiplexing on each optical packet, and transmits the multiplexed optical-packet signal obtained as a result of optical wavelength multiplexing to the source node, which is the transceiving node 100.

If the transceiving node 200 is a receiving node, the optical transceivers 211 to 214 output the optical packets received from the wavelength multiplexing-demultiplexing filter 210 back to the wavelength multiplexing-demultiplexing filter 210 itself.

The transceiving node 300 includes a wavelength multiplexing-demultiplexing filter 310 and optical transceivers 311 to 314. The transceiving node 300 also includes a packet managing unit, which is functionally identical to the packet managing unit 120 of the transceiving node 100. Hence, the description thereof is omitted.

The wavelength multiplexing-demultiplexing filter 310 demultiplexes the multiplexed optical-packet signal received from the transceiving node 100 into optical packets allocated to respective wavelength bands, and outputs the demultiplexed optical packets to the optical transceivers 311 to 314. Upon receiving the optical packets from the optical transceivers 311 to 314, the wavelength multiplexing-demultiplexing filter 310 performs optical wavelength multiplexing on each optical packet, and transmits the multiplexed optical-packet signal obtained as a result of optical wavelength multiplexing to the source node, which is the transceiving node 100.

Figure 2:
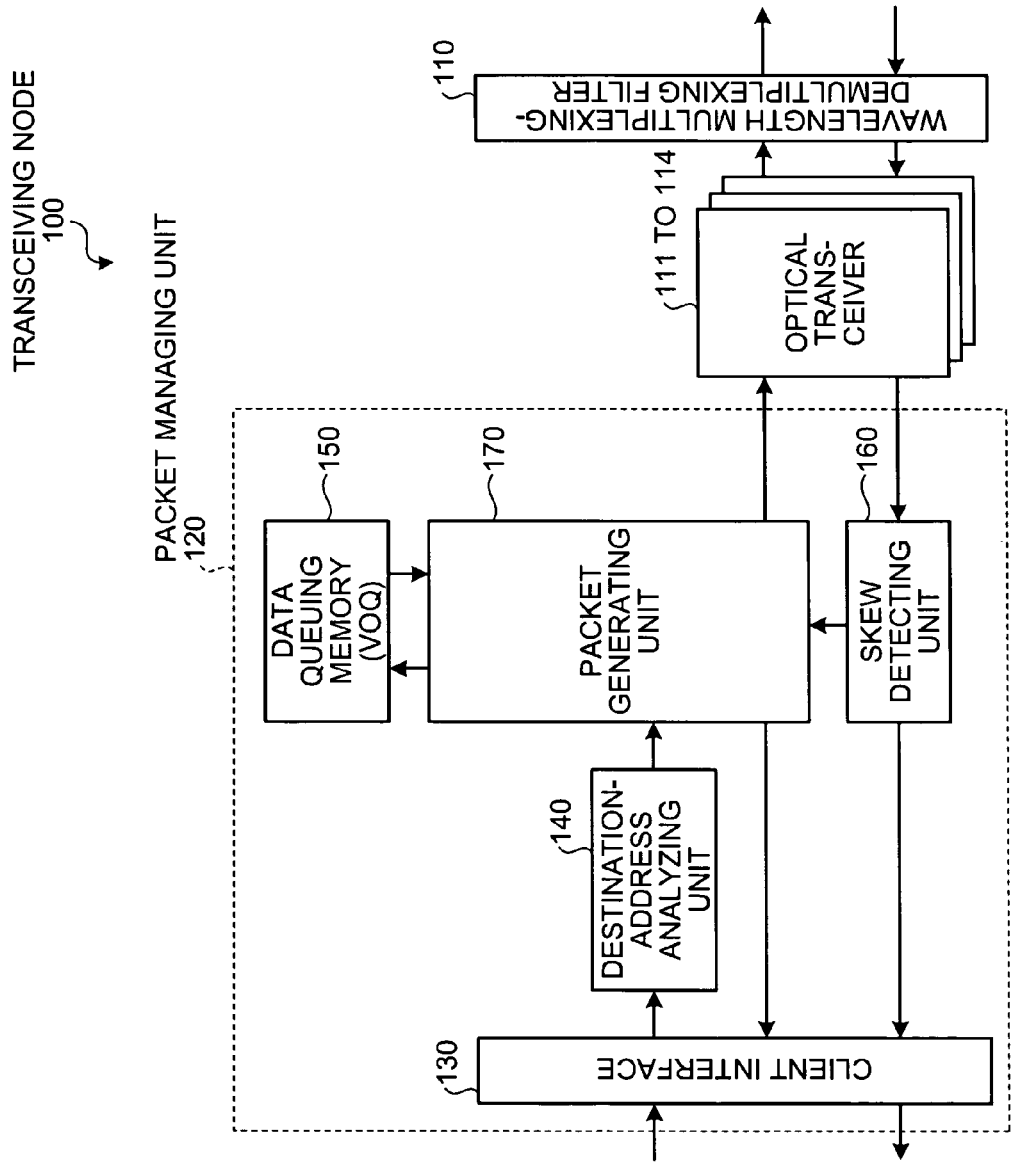
FIG. 2 is a functional block diagram of a transceiving node according to the first embodiment.

A detailed configuration of the transceiving node shown in FIG. 1 is described below. FIG. 2 is a functional block diagram of the transceiving node according to the first embodiment. As shown in FIG. 2, the transceiving node 100 includes the wavelength multiplexing-demultiplexing filter 110, the optical transceivers 111 to 114, and the packet managing unit 120.

The function of the wavelength multiplexing-demultiplexing filter 110 has already been described above with reference to FIG. 1, and hence is not repeated here. The optical transceivers 111 to 114 convert target packets, that is, packets to be converted to optical packets (hereinafter simply referred to as packets), received from the packet managing unit 120 to optical packets (hereinafter, those packets converted into optical signals are referred to as optical packets), and output the optical packets to the wavelength multiplexing-demultiplexing filter 110.

The optical transceivers 111 to 114 are set by a manager so as to perform different processes upon receiving the optical packets from the wavelength multiplexing-demultiplexing filter 110, depending on whether the transceiving node 100 is a transmitting node or a receiving node.

If the transceiving node 100 is a transmitting node, the optical transceivers 111 to 114 convert the optical packets received from the wavelength multiplexing-demultiplexing filter 110 to packets, and output the packets to a skew detecting unit 160.

If the transceiving node 100 is a receiving node, the optical transceivers 111 to 114 transmit the optical packets sent from the wavelength multiplexing-demultiplexing filter 110 back to the source transceiving node which transmits the optical packets (that is, the multiplexed optical-packet signal that includes the optical packets).

The packet managing unit 120 includes a client interface 130, a destination-address analyzing unit 140, a data queuing memory (virtual output queue (VOQ)) 150, the skew detecting unit 160, and a packet generating unit 170.

The client interface 130 performs data communication between the packet managing unit 120 and a computer (not shown) such as a central processing unit (CPU). The client interface 130 outputs the data received from the computer to the destination-address analyzing unit 140. The data received by the packet managing unit 120 from the computer includes the address of a destination transceiving node and the data to be transmitted to the destination transceiving node. The client interface 130 also outputs the data received from the skew detecting unit 160 to the computer.

The destination-address analyzing unit 140 analyzes, on receiving data from the client interface 130, the destination transceiving node address to which the data received from the client interface 130 is to be transmitted. The destination-address analyzing unit 140 outputs data obtained as a result of analysis (hereinafter, "analysis result data") and the data received from the client interface 130 (hereinafter, "transmission data") to the packet generating unit 170.

The data queuing memory 150 stores therein transmission data for each address. FIG. 3 is a diagram of an example of data structure of queue data stored in the data queuing memory 150. As shown in FIG. 3, the queue data includes destination-node identification data, which is a unique data assigned to each destination transceiving node, stored in an associated form with the transmission data to be transmitted to the node.

The skew detecting unit 160 receives packets allocated to respective wavelength bands of the multiplexed optical signal from the optical transceivers 111 to 114, and detects the skew amount for each optical packet based on the received packet.

Figure 4:
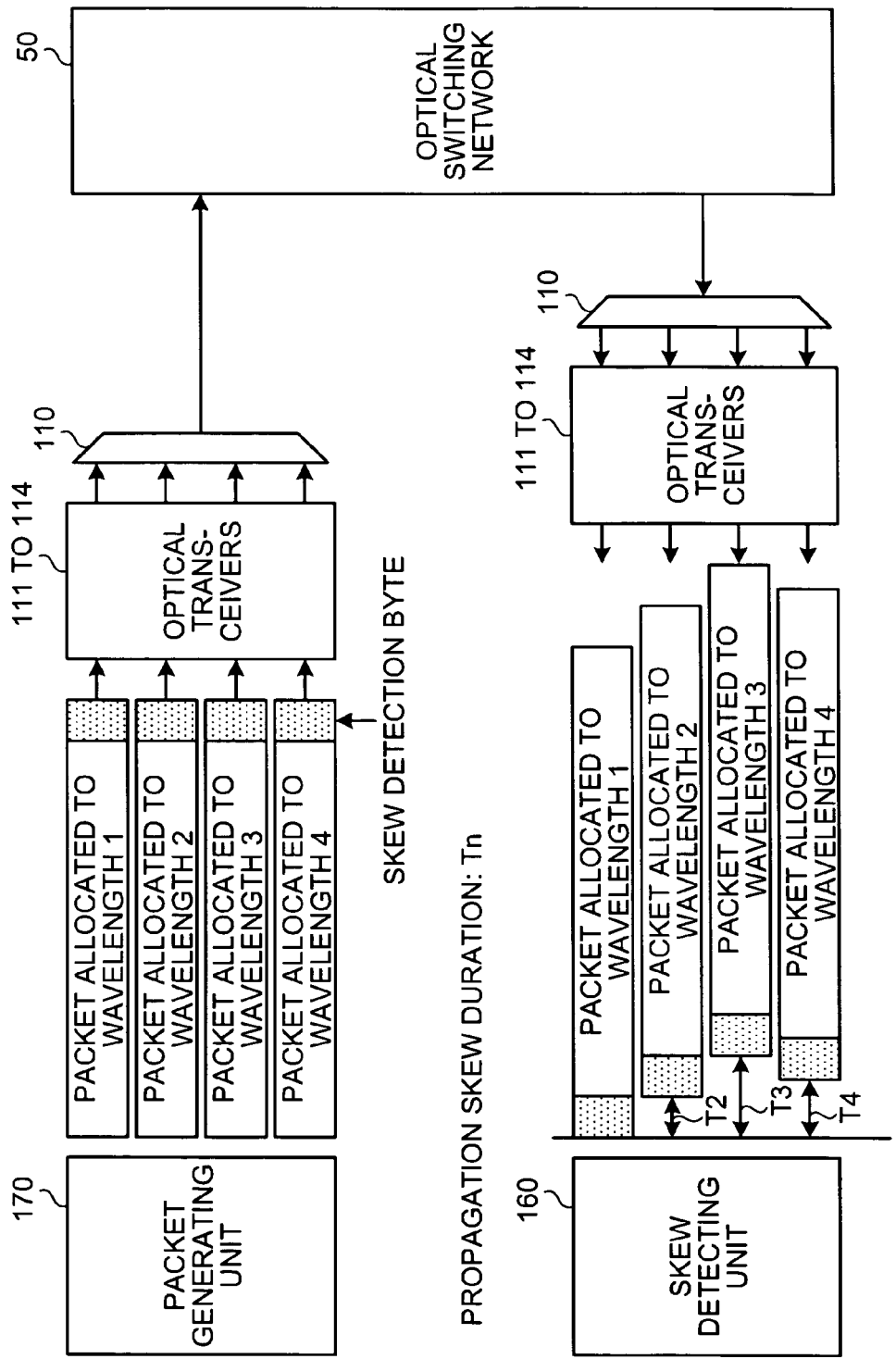
FIG. 4 is a schematic for explaining a process performed by a skew detecting unit according to the first embodiment.

FIG. 4 is a schematic for explaining a process performed by the skew detecting unit 160 according to the first embodiment. In the example in FIG. 4, the packet generating unit 170 is shown as outputting simultaneously to the optical transceivers 111 to 114 the packets allocated to wavelengths (wavelength bands) 1 to 4 of the multiplexed optical-packet signal. At the head of each packet there is a skew detection byte for detecting a skew amount.

The skew detecting unit 160 receives the packets allocated to respective wavelengths 1 to 4 from the optical transceivers 111 to 114 and detects the skew amount. As shown in FIG. 4, the packet allocated to the wavelength 1 reaches the skew detecting unit 160 followed by the packets allocated to the wavelengths 2, 4, and 3.

The skew detecting unit 160 takes a detection timing (or reference clock timing) of the skew detection byte of the packet that arrives first (the packet allocated to the wavelength 1 in FIG. 4) as a reference, and compares the arrival timing of the skew detection byte of the next packet with the reference to detect the skew amount of each wavelength.

In the example shown in FIG. 4, the skew amount for the wavelength 1 is 0, for the wavelength 2 is T2, for the wavelength 3 is T3, and for the wavelength 4 is T4. However, the skew amounts T2 to T4 represent skew amounts for back and forth transmission from the transmitting node to the receiving node and back to the transmitting node. The actual skew amount from the transmitting node to the receiving node therefore would be half of each of the skew amounts T2 to T4. In other words, in the example shown in FIG. 4, the skew amount for the wavelength 1 would be 0, for the wavelength 2 would be T2/2, for the wavelength 3 would be T3/2, and for the wavelength 4 would be T4/2.

The skew detecting unit 160 outputs data of the detected skew amount as skew-amount detection data to the packet generating unit 170. The skew-amount detection data includes, in an associated form, the detected skew amount, the wavelength corresponding to the skew amount, and data relating to the destination of the multiplexed optical-packet signal.

Upon receiving from the optical transceivers 111 to 114 a packet that includes user data and that is not meant for skew amount detection, the skew detecting unit 160 outputs the packet to the client interface 130.

The packet generating unit 170 performs various processes related to packet generation. Specifically, the packet generating unit 170 performs a memory storage process, a management-data creation process, and a packet generation process. The memory storage process is performed when the packet generating unit 170 obtains the analysis result data and the transmission data from the destination-address analyzing unit 140. The management-data creation process is performed when the packet generating unit 170 receives the skew-amount detection data from the skew detecting unit 160 to create and update management data for managing the skew amount. In the packet generation process, the packet generating unit 170 generates packets and outputs them to the optical transceivers 111 to 114. Each of the processes of the packet generating unit 170 will be described below in detail.

The memory storage process performed by the packet generating unit 170 is described first. Upon receiving the analysis result data and the transmission data from the destination-address analyzing unit 140, the packet generating unit 170 compares the analysis result data and the queue data (see FIG. 3), identifies the destination-node identification data corresponding to the analysis result data, and stores the transmission data in the queue data in association with the identified destination-node identification data.

The packet generating unit 170 further monitors the amount of data stored in the data queuing memory 150 and controls the amount of data output by the computer (not shown) to the packet managing unit 120. If the amount of data stored in the data queuing memory 150 exceeds a preset reference value, the packet generating unit 170 issues a request to the computer for discontinuing data output to the packet managing unit 120. If, on the other hand, the amount of data stored in the data queuing memory 150 falls to or below the reference value, the packet generating unit 170 issues a request to the computer for resuming data output to the packet managing unit 120.

The management-data creation process performed by the packet generating unit 170 is described next. Upon receiving the skew-amount detection data from the skew detecting unit 160, the packet generating unit 170 creates the management data based on the received skew-amount detection data, and stores the management data in a storage unit provided in the packet generating unit 170. FIG. 5 is a diagram of an example of data structure of the management data according to the first embodiment.

The management data includes the destination-node identification data which identifies each node and the wavelengths 1 to 4, as shown in FIG. 5. Boxes corresponding to the wavelengths 1 to 4 represent the skew amounts of the optical packets allocated to the wavelength bands corresponding to the wavelengths 1 to 4 upon transmission of the multiplexed optical-packet signal to the destination node.

For example, in the first row in FIG. 5, the skew amount of each of the wavelengths 1 to 4 upon transmission of the multiplexed optical-packet signal to the node 1 is stored. Specifically, the skew amount of the optical packet allocated to the wavelength 1 is 0 nanoseconds, to the wavelength 2 is 10 nanoseconds, to the wavelength 3 is 20 nanoseconds, and to the wavelength 4 is 15 nanoseconds.

Therefore, when the packet generating unit 170 generates packets and outputs them simultaneously to the optical transceivers 111 to 114, allocating each packet to each wavelength band, the optical packet allocated to the wavelength 2 reaches the node 1 with a delay of 10 nanoseconds after the optical packet allocated to the wavelength 1 reaches the node 1. Similarly, the optical packet allocated to the wavelength 3 reaches the node 1 with a delay of 20 nanoseconds after the optical packet allocated to the wavelength 1 reaches the node 1. Likewise, the optical packet allocated to the wavelength 4 reaches the node 1 with a delay of 15 nanoseconds after the optical packet allocated to the wavelength 1 reaches the node 1. The packet generating unit 170 performs the management-data creation process prior to actual operation.

The packet generation process performed by the packet generating unit 170 is described next. The packet generating unit 170 selects the destination node sequentially from the data queuing memory 150 and retrieves the transmission data to be transmitted to the destination node from the data queuing memory 150. The order in which the packet generating unit 170 selects the destination node can be arbitrary, and can, for instance, be in the descending order of priority, or in the order in which the transmission data corresponding to the destination nodes are stored in the data queuing memory 150.

The packet generating unit 170 then compares the selected destination node and the management data (see FIG. 5) to determine the skew amount for each of the wavelengths 1 to 4. Based on the skew amount, the packet generating unit 170 adjusts the delay amount of each packet (containing the transmission data to be transmitted to the destination node) allocated to each wavelength band, so that all the packets reach the destination node at the same timing.

For example, when transmitting the multiplexed optical-packet signal to the node 1 in the first row of FIG. 5, the packet generating unit 170 outputs the packets allocated to the wavelengths 2 to 4 to the optical transceivers 111 to 114 earlier than the packet allocated to the wavelength 1, so that all the optical packets reach the node 1 at the same timing.

In other words, the packet generating unit 170 outputs the packets allocated to the wavelengths 2, 3, and 4 to the optical transceivers 111 to 114, respectively, 10, 20, and 15 nanoseconds earlier than the packet allocated to the wavelength 1.

Figure 6:
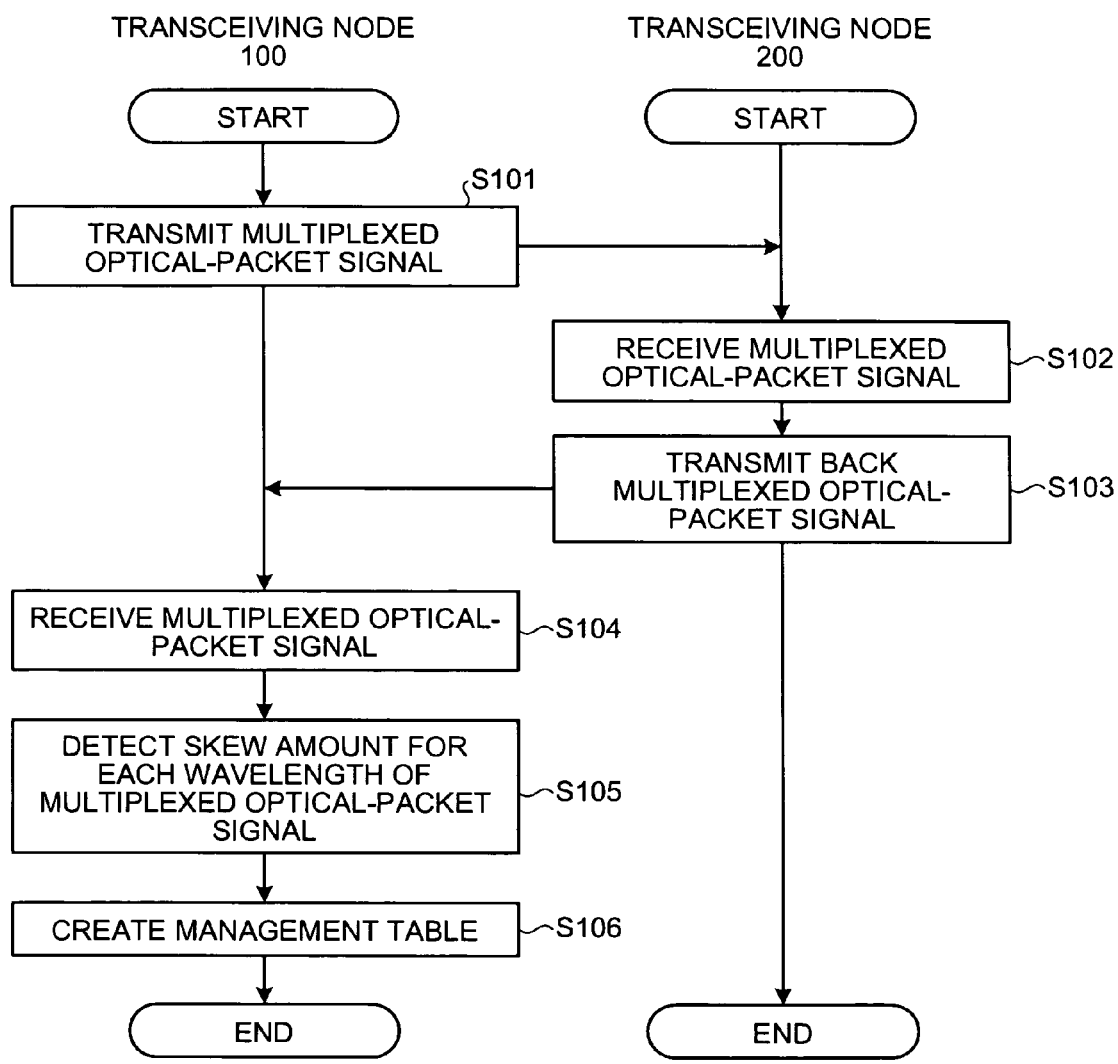
FIG. 6 is a flowchart of a process performed by the optical transmission system according to the first embodiment.

The process performed by the optical transmission system according to the first embodiment prior to the actual operation is described below. FIG. 6 is a flowchart of the process performed by the optical transmission system according to the first embodiment. For the sake of convenience, it is supposed in FIG. 6 that the transceiving node 100 transmits the multiplexed optical-packet signal to the transceiving node 200.

The transceiving node 100 outputs the multiplexed optical-packet signal to the transceiving node 200 (step S101). The transceiving node 200 receives the multiplexed optical-packet signal (step S102) and transmits it back to the transceiving node 100 (step S103).

The transceiving node 100 receives the multiplexed optical-packet signal from the transceiving node 200 (step S104), detects the skew amount of each optical packet of the multiplexed optical-packet signal (step S105), and creates the management table (step S106).

Thus, in the optical transmission system, the transmitting transceiving node and the receiving transceiving node exchange multiplexed optical-packet signals between themselves in order to accurately correct skew that occurs during transmission over the optical switching network 50.

Thus, in the optical transmission system according to the first embodiment in which optical transmission is carried out over the optical switching network 50 of optical switches, the transmitting transceiving node creates a multiplexed optical-packet signal by performing optical wavelength multiplexing on a plurality of optical packets, and transmits the multiplexed optical-packet signal to the receiving transceiving node. The receiving transceiving node transmits the multiplexed optical-packet signal back to the source node on receiving the multiplexed optical-packet signal from the transmitting transceiving node. The transmitting trans receiving node detects the skew amount of each optical packet allocated to each wavelength band of the multiplexed optical-packet signal received back from the destination transceiving node, and adjusts the delay amount of each optical packet allocated to each wavelength band of the multiplexed optical-packet signal transmitted to the receiving transceiving node based on the detected skew amount corresponding to the optical packet. Thus, skew that occurs in the multiplexed optical-packet signal during transmission can be corrected.

As a result of the correction of skew occurs during the transmission of the multiplexed optical-packet signal, the optical transmission system according to the first embodiment is able to increase the bands by wavelength multiplexing technology. Further, the optical transmission system according to the first embodiment is capable of correcting the multiplexed optical-packet signal transmitted over any channel, thereby improving network utilization efficiency.

An overview and a salient feature of the optical transmission system according to a second embodiment of the present invention are described below. The optical transmission system according to the second embodiment performs optical transmission over an optical switching network of optical switches, in which a node on the transmitting side (hereinafter, "transmitting node") performs optical wavelength multiplexing on a plurality of optical packets to generate a multiplexed optical-packet signal, and transmits the multiplexed optical-packet signal to a node on the receiving side (hereinafter, "receiving node").

The receiving node detects the skew amount of each optical packet allocated to each wavelength band of the multiplexed optical-packet signal received from the transmitting node, and transmits the skew amount data to a control node (which is a node distinct from the transmitting node and the receiving node). The control node outputs the skew amount data to the transmitting node when traffic in the optical switching network is light. The transmitting node adjusts the delay amount of the optical packet allocated to each wavelength band of the multiplexed optical-packet signal transmitted to the receiving node based on the skew amount received from the control node.

Thus, in the optical transmission system according to the second embodiment, the control node outputs the skew amount data to the transmitting node when there is little traffic in the optical switching network, thus reducing the load on the optical switching network. Similar to the optical transmission system according to the first embodiment, the optical transmission system according to the second embodiment adjusts the delay amount of each optical packet of the multiplexed optical-packet signal transmitted from the transmitting node to the receiving node, thereby correcting the skew that occurs in the multiplexed optical-packet signal during transmission.

Figure 7:
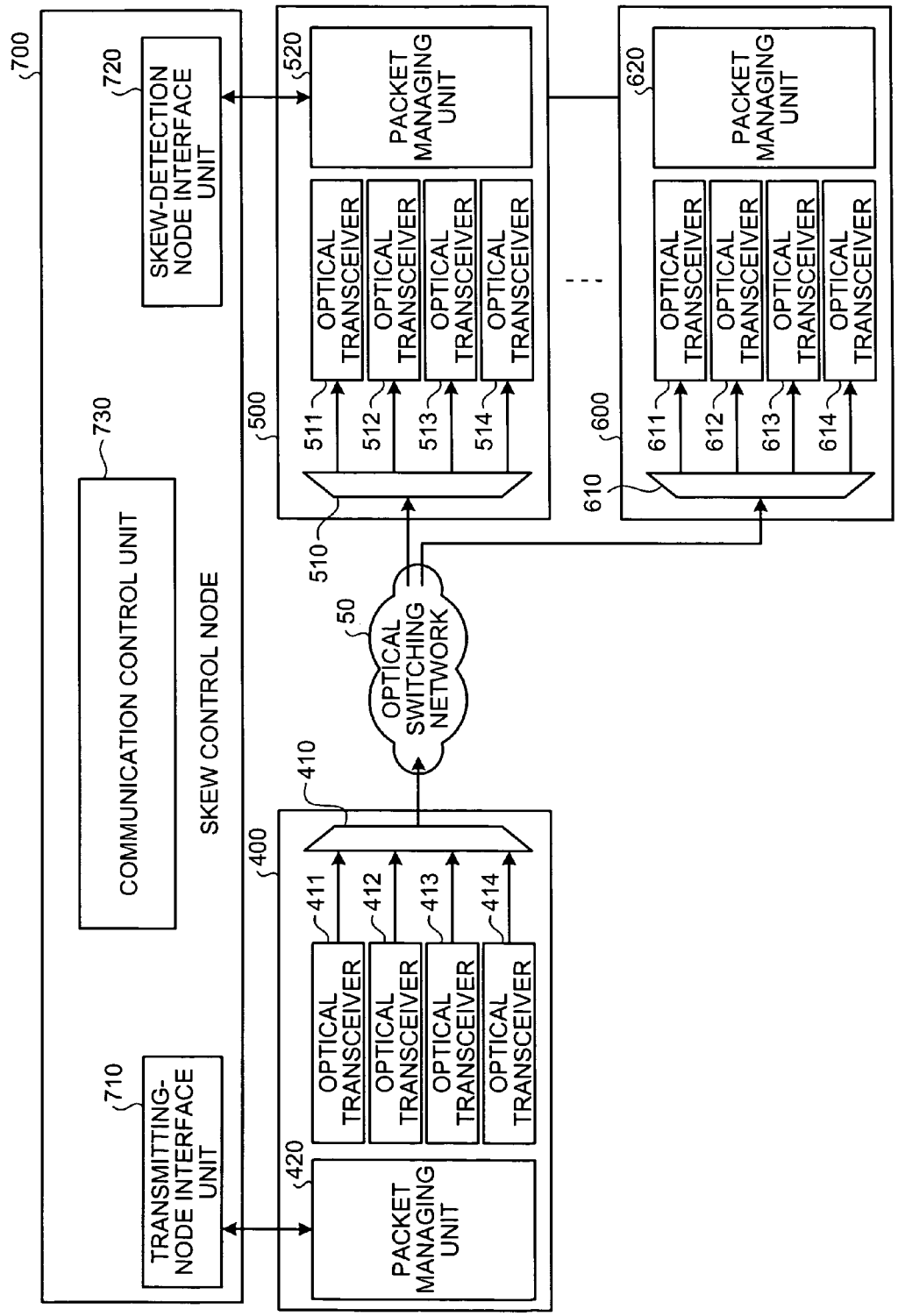
FIG. 7 is a diagram of a configuration of an optical transmission system according to a second embodiment of the present invention.

A configuration of the optical transmission system according to the second embodiment is described below. FIG. 7 is a block diagram of the configuration of the optical transmission system according to the second embodiment. As shown in FIG. 7, the optical transmission system according to the second embodiment includes transceiving nodes 400 to 600 and a skew control node 700, all of which are connected to the optical switching network 50. The optical switching network 50 is structurally and functionally identical to the optical switching network 50 and hence the description thereof is not repeated.

The transceiving nodes 400 to 600 are devices among which data communication (through exchange of multiplexed optical-packet signals) takes place. For the sake of convenience, it is supposed that multiplexed optical-packet signals are transmitted from the transceiving node 400 to the transceiving nodes 500 and 600 in FIG. 7.

Rough configurations of the transceiving nodes 400 to 600 are described below. As shown in FIG. 7, the transceiving node 400 includes a wavelength multiplexing-demultiplexing filter 410, optical transceivers 411 to 414, and a packet managing unit 420.

The wavelength multiplexing-demultiplexing filter 410 performs optical wavelength multiplexing (WDM) on each of the optical packets received from the optical transceivers 411 to 414 to generate a multiplexed optical-packet signal and transmits the multiplexed optical-packet signal to a destination transceiving node. Upon receiving the multiplexed optical-packet signal over the optical switching network 50, the wavelength multiplexing-demultiplexing filter 410 demultiplexes the multiplexed optical-packet signal into optical packets by their wavelength bands, and outputs the optical packets to the optical transceivers 411 to 414.

The optical transceivers 411 to 414 convert packets received from the packet managing unit 420 into optical packets and output the optical packets to the wavelength multiplexing-demultiplexing filter 410. Upon receiving the optical packets from the wavelength multiplexing-demultiplexing filter 410, the optical transceivers 411 to 414 convert the optical packets to electrical signals and outputs the packets converted to electrical signals to the packet managing unit 420.

The packet managing unit 420 creates packets (that are later converted to optical packets) and outputs them to the optical transceivers 411 to 414. The packet managing unit 420 further adjusts the delay amount of each optical packet based on the skew amount of each optical packet received from the skew control node 700.

The transceiving node 500 includes a wavelength multiplexing-demultiplexing filter 510, optical transceivers 511 to 514, and a packet managing unit 520.

The wavelength multiplexing-demultiplexing filter 510 demultiplexes the multiplexed optical-packet signal into the optical packet allocated to each wavelength band of the multiplexed optical-packet signal received from the transceiving node 400 and outputs the optical packets to the optical transceivers 511 to 514. Upon receiving the optical packets from the optical transceivers 511 to 514, the wavelength multiplexing-demultiplexing filter 510 performs optical wavelength multiplexing on each optical packet, and transmits the multiplexed optical-packet signal obtained as a result of optical wavelength multiplexing to the destination transceiving node.

The optical transceivers 511 to 514 convert the optical packets received from the wavelength multiplexing-demultiplexing filter 510 to electrical signals and output the packets converted to electrical signals to the packet managing unit 520. Upon receiving the packets from the packet managing unit 520, the optical transceivers 511 to 514 convert the packets into optical packets, and output the optical packets to the wavelength multiplexing-demultiplexing filter 510.

The packet managing unit 520 detects the skew amount of each optical packet (optical packet allocated to each wavelength band) received from the source node, which is the transceiving node 400, based on the packet allocated to each wavelength band of the multiplexed optical-packet signal, and outputs the data of detected skew amount (skew-amount detection data) to the skew control node 700.

The transceiving node 600 includes a wavelength multiplexing-demultiplexing filter 610, optical transceivers 611 to 614, and a packet managing unit 620.

The wavelength multiplexing-demultiplexing filter 610 demultiplexes the multiplexed optical-packet signal into the optical packets allocated to respective wavelength bands of the multiplexed optical-packet signal received from the transceiving node 400, and outputs the optical packets to the optical transceivers 611 to 614. Upon receiving the optical packets from the optical transceivers 611 to 614, the wavelength multiplexing-demultiplexing filter 610 performs optical wavelength multiplexing on each optical packet, and transmits the multiplexed optical-packet signal obtained as a result of optical wavelength multiplexing to the destination transceiving node.

The optical transceivers 611 to 614 convert the optical packets received from the wavelength multiplexing-demultiplexing filter 610 to electrical signals, and output the packets converted to electrical signals to the packet managing unit 620. Upon receiving the packets from the packet managing unit 620, the optical transceivers 611 to 614 convert the packets into optical packets and output the optical packets to the wavelength multiplexing-demultiplexing filter 610.

On receiving the multiplexed optical-packet signal from the source node, which is the transceiving node 400, the packet managing unit 620 detects the skew amount of each of the optical packets (optical packet allocated to each wavelength band) based on the packets allocated to respective wavelength bands of the multiplexed optical-packet signal, and outputs the data of detected skew amount (skew-amount detection data) to the skew control node 700.

The skew control node 700 shown in FIG. 7 is described below. The skew control node 700 manages the skew-amount detection data detected by the transceiving nodes 400 to 600, and includes a transmitting-node interface unit 710, a skew-detection node interface unit 720, and a communication control unit 730.

The transmitting-node interface unit 710 performs data communication between the skew control node 700 and the transmitting transceiving node (transceiving node 400 in the second embodiment). The skew-detection node interface unit 720 performs data communication between the skew control node 700 and the receiving transceiving node (the transceiving nodes 500 and 600 in the second embodiment).

The communication control unit 730 stores the skew-amount detection data received from the transceiving nodes 500 and 600 in a storage unit (not shown). The communication control unit 730 further detects a traffic amount in the optical switching network 50, and if the traffic amount is less than a preset reference value, outputs the skew-amount detection data stored in the storage unit to the transmitting transceiving node 400.

The communication control unit 730 stores the skew-amount detection data in an associated form with the corresponding transceiving-node identification data. When transmitting the skew-amount detection data to the transmitting transceiving node 400, the communication control unit 730 also outputs the transceiving-node identification data associated with the skew-amount detection data.

Figure 8:
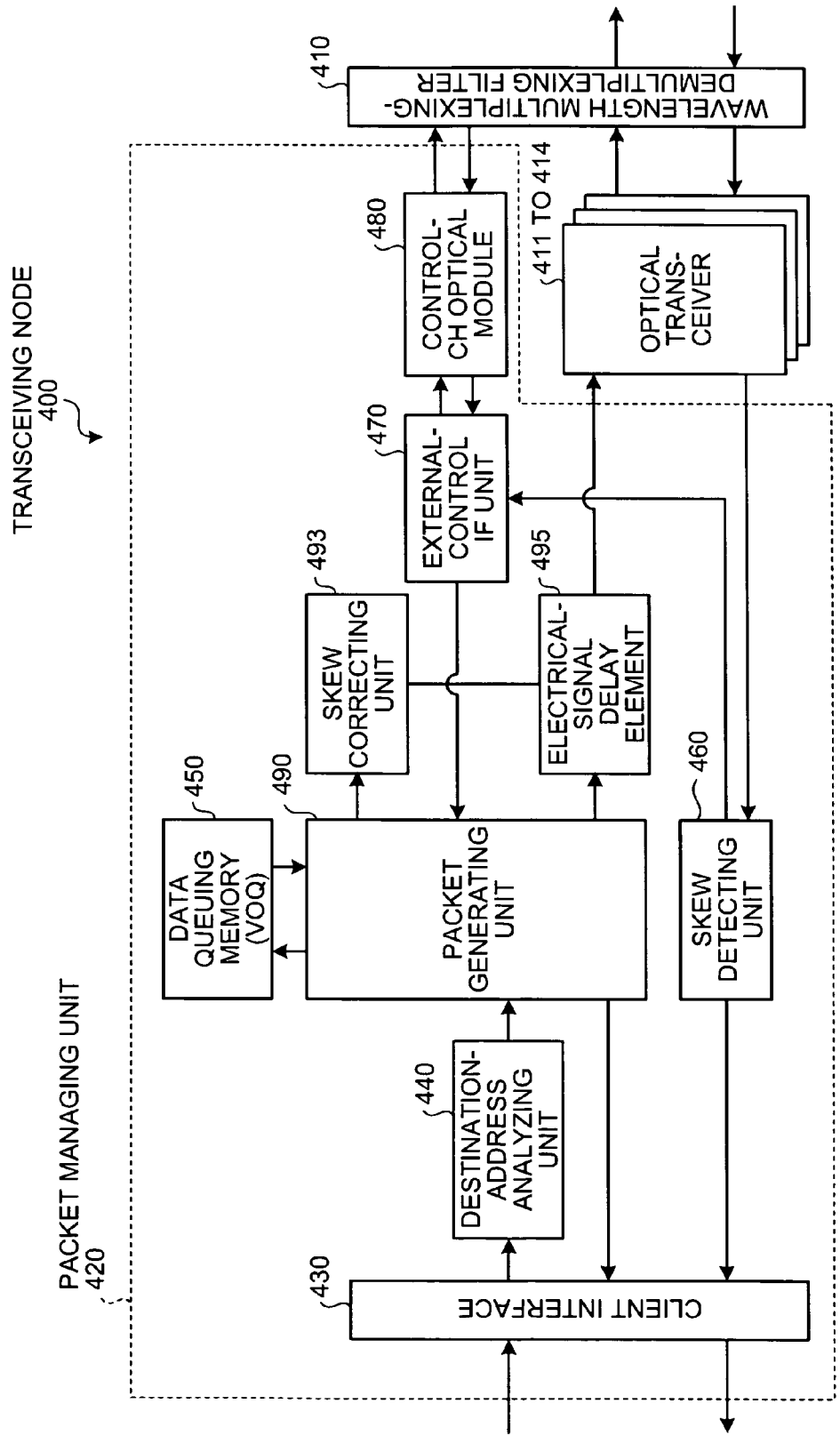
FIG. 8 is a functional block diagram of a transceiving node according to the second embodiment.

A detailed configuration of the transceiving node shown in FIG. 7 is described below. FIG. 8 is a functional block diagram of the transceiving node according to the second embodiment. As shown in FIG. 8, the transceiving node 400 includes the wavelength multiplexing-demultiplexing filter 410, the optical transceivers 411 to 414, and the packet managing unit 420.

The functions of the wavelength multiplexing-demultiplexing filter 410 and the optical transceivers 411 to 414 have already been described with reference to FIG. 7, and hence the descriptions thereof are not repeated.

The packet managing unit 420 includes a client interface 430, a destination-address analyzing unit 440, a data queuing memory (VOQ) 450, a skew detecting unit 460, an external-control IF unit 470, a control-ch optical module 480, a packet generating unit 490, a skew correcting unit 493, and an electrical-signal delay element 495.

The client interface 430 performs data communication between the packet managing unit 420 and a computer (not shown) such as a CPU. The client interface 430 outputs the data received from the computer to the destination-address analyzing unit 440. The data output by the computer to the packet managing unit 420 includes the address of a destination transceiving node and the data to be transmitted to the destination transceiving node. The client interface 430 also outputs the data received from the skew detecting unit 460 to the computer.

The destination-address analyzing unit 440 analyzes the destination transceiving node address to which the data received from the client interface 430 is to be transmitted, and outputs the data obtained as a result of analysis (hereinafter, "analysis result data") and the data received from the client interface 430 (hereinafter, "transmission data") to the packet generating unit 490.

The data queuing memory 450 stores therein transmission data for each address. The data queuing memory 450 stores queue data similar to the data shown in FIG. 3.

If the transceiving node 400 is a receiving node, the skew detecting unit 460 receives the packet allocated to each wavelength band of the multiplexed optical-packet signal from the transmitting transceiving node, and detects the skew amount of the optical packet allocated to each wavelength band based on the received packet.

Figure 9:
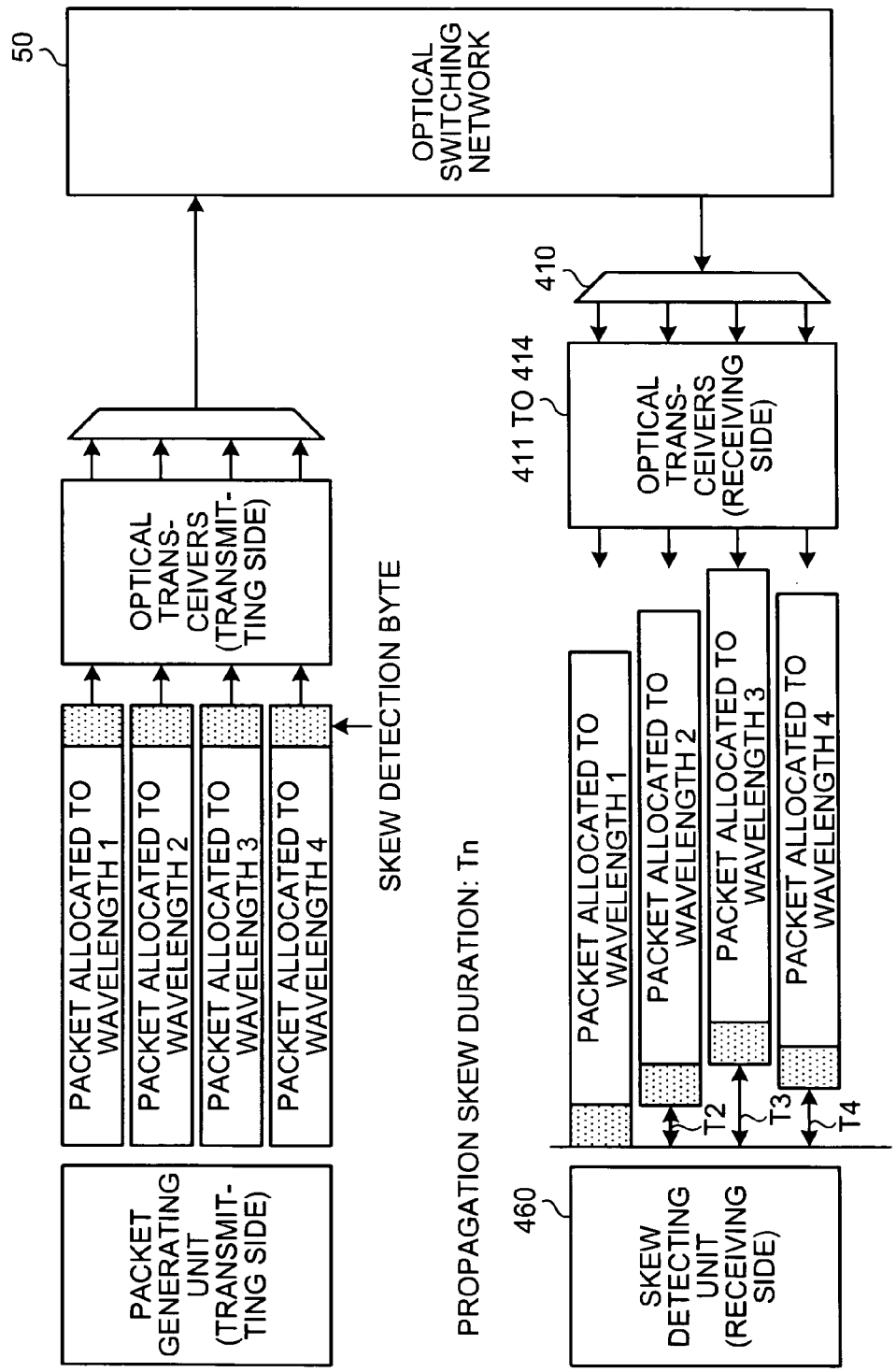
FIG. 9 is a schematic for explaining a process performed by a skew detecting unit according to the second embodiment.

FIG. 9 is a schematic for explaining a process performed by the skew detecting unit 460 according to the second embodiment. In the example in FIG. 9, the packet generating unit (of the transmitting node) is shown as outputting the packets allocated to the wavelengths (wavelength bands) 1 to 4 of the multiplexed optical-packet signal simultaneously to the optical transceiver (of the transmitting node). At the head of each packet there is a skew detection byte for detecting a skew amount.

The skew detecting unit 460 receives the packets allocated to the respective wavelengths 1 to 4 from the optical transceivers 411 to 414 and detects the skew amount. As shown in FIG. 9, the packet allocated to the wavelength 1 reaches the skew detecting unit 460 followed by the packet allocated to the wavelengths 2, 4, and 3.

In the example shown in FIG. 9, the skew amount for the wavelength 1 is 0, for the wavelength 2 is T2, for the wavelength 3 is T3, and for the wavelength 4 is T4. The skew detecting unit 460 outputs data of the detected skew amount as skew-amount detection data to the external-control IF unit 470.

Upon receiving from the optical transceivers 411 to 414 a packet that includes user data and that is not meant for skew amount detection, the skew detecting unit 460 outputs the packet to the client interface 430.

The external-control IF unit 470 controls the input and output of the data to and from the skew detecting unit 460, the control-ch optical module 480, the packet generating unit 490, and the skew correcting unit 493.

The external-control IF unit 470 outputs the skew-amount detection data received from the skew detecting unit 460 to the control-ch optical module 480. The control-ch optical module 480 performs data communication between the packet managing unit 420 and the transmitting-node interface unit 710 or the skew-detection node interface unit 720 shown in FIG. 7. The control-ch optical module 480, upon receiving the skew-amount detection data from the external-control IF unit 470, outputs the skew-amount detection data in an associated form with the identification data of the transceiving node 400 to the skew control node 700.

The control-ch optical module 480 outputs the skew-amount detection data and the identification data received from the skew control node 700 to the external control IF unit 470. Then, the external control IF unit 470 outputs the skew-amount detection data and the identification data to the packet generating unit 490.

The packet generating unit 490 performs various processes related to packet generation. Specifically, the packet generating unit 490 performs a memory storage process, a management-data creation process, and a packet generation process. The memory storage process is performed when the packet generating unit 490 receives the analysis result data and the transmission data from the destination-address analyzing unit 440. The management-data creation process is performed when the packet generating unit 490 receives the skew-amount detection data from the external-control IF unit 470 to create and update management data for managing the skew amount. In the packet generation process, the packet generating unit 490 generates packets and outputs them to the electrical-signal delay element 495. Each of the processes of the packet generating unit 490 will be described below in detail.

The memory storage process performed by the packet generating unit 490 is described first. Upon receiving the analysis result data and the transmission data from the destination-address analyzing unit 440, the packet generating unit 490 compares the analysis result data and the queue data (see FIG. 3), identifies the destination-node identification data corresponding to the analysis result data, and stores the transmission data in the queue data in association with the identified destination-node identification data.

The packet generating unit 490 further monitors the amount of data stored in the data queuing memory 450 and controls the amount of data output by the computer (not shown) to the packet managing unit 420. If the amount of data stored in the data queuing memory 450 exceeds a preset reference value, the packet generating unit 490 issues a request to the computer for discontinuing data output to the packet managing unit 420. If, on the other hand, the amount of data stored in the data queuing memory 450 falls to or below the reference value, the packet generating unit 490 issues a request to the computer for resuming data output to the packet managing unit 420.

The management-data creation process performed by the packet generating unit 490 is described next. Upon receiving the skew-amount detection data and the identification data from the external-control IF unit 470, the packet generating unit 490 creates the management data based on the received skew-amount detection data and stores the management data in a storage unit provided in the packet generating unit 490. The management data stored in the storage unit by the packet generating unit 490 is identical to the management data shown in FIG. 5. Hence, the description thereof is omitted.

The packet generation process performed by the packet generating unit 490 is described next. The packet generating unit 490 selects the destination node sequentially from the data queuing memory 450 and retrieves the transmission data to be transmitted to the destination node from the data queuing memory 450. The order in which the packet generating unit 490 selects the destination nodes can be arbitrary, and can, for instance, be in the descending order of priority, or in the order in which the transmission data corresponding to the destination nodes are stored in the data queuing memory 450. The packet generating unit 490 generates a packet from the transmission data and outputs the packet to the electrical-signal delay element 495.

The skew correcting unit 493 controls the electrical-signal delay element 495 to adjust the delay amount of the packet allocated to each of the wavelength bands corresponding to the wavelengths 1 to 4, based on the management data stored in the storage unit of the packet generating unit 490. In response to a control command from the skew correcting unit 493, the electrical-signal delay element 495, which is a commonly used conventional delay element, varies the output timing of each packet received from the packet generating unit 490 while outputting them to the optical transceivers 411 to 414.

For example, when transmitting the multiplexed optical-packet signal to the node 1 in the first row of FIG. 5, the skew correcting unit 493 outputs the packets allocated to the wavelengths 2 to 4 to the optical transceivers 411 to 414 earlier than the packet allocated to the wavelength 1, so that all the optical packets reach the node 1 at the same timing.

In other words, the skew correcting unit 493 controls the electrical-signal delay element 495 such that the packets allocated to the wavelengths 2, 3, and 4 are output to the optical transceivers 411 to 414, respectively, 10, 20, and 15 nanoseconds earlier than the packet allocated to the wavelength 1.

Figure 10:
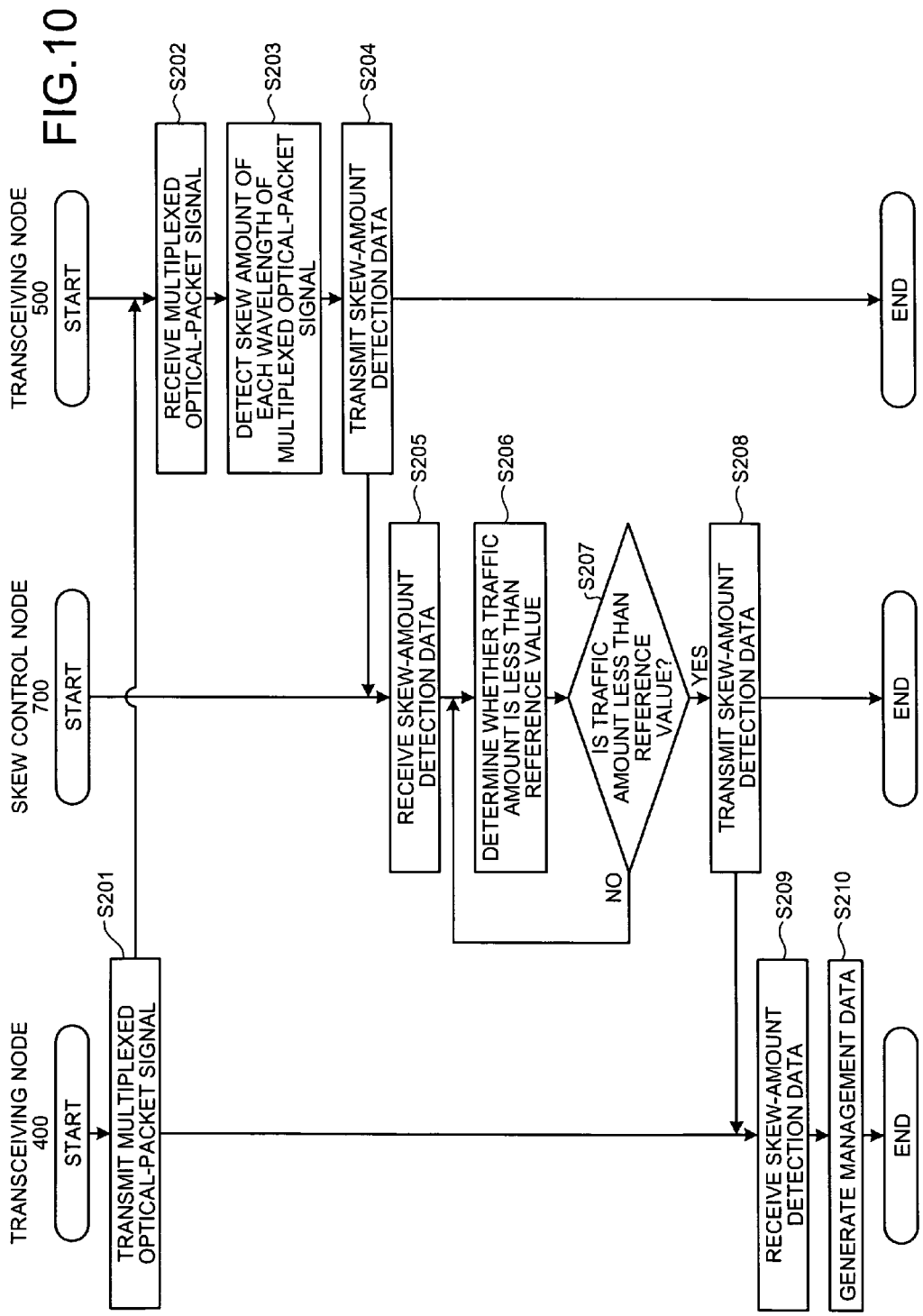
FIG. 10 is a flowchart of a process performed by the optical transmission system according to the second embodiment.

The process performed by the optical transmission system according to the second embodiment prior to the actual operation is described below. FIG. 10 is a flowchart of the process performed by the optical transmission system according to the second embodiment. For the sake of convenience, it is supposed in FIG. 10 that the transceiving node 400 transmits the multiplexed optical-packet signal to the transceiving node 500.

As shown in FIG. 10, the transceiving node 400 transmits the multiplexed optical-packet signal to the transceiving node

500 (step S201). Upon receiving the multiplexed optical-packet signal (step S202), the transceiving node 500 detects the skew amount for every wavelength of the multiplexed optical-packet signal (step S203).

The transceiving node 500 then transmits the skew-amount detection data to the skew control node 700 (step S204). The skew control node 700 receives the skew-amount detection data and stores it in the storage unit (step S205). The skew control node 700 determines whether the traffic amount in the optical switching network 50 is less than the preset reference value (step S206), and if the traffic amount is equal to or greater than the preset reference value (No at step S207), repeats step S206.

If the traffic amount is less than the preset reference value (Yes at step S207), the skew control node 700 outputs the skew-amount detection data to the transceiving node 400 (step S208). Upon receiving the skew-amount detection data from the skew control node 700 (step S209), the transceiving node 400 generates management data (step S210).

Thus, by using the skew control node 700 to output the skew-amount detection data to the transmitting transceiving node, the optical transmission system can lessen the load on the optical switching network.

Thus, in the optical transmission system according to the second embodiment, optical transmission is performed over the optical switching network 50 of optical switches, the transmitting transceiving node generates the multiplexed optical-packet signal by performing optical wavelength multiplexing on a plurality of optical packets, and transmits the generated multiplexed optical-packet signal to the receiving transceiving node. The receiving transceiving node detects the skew amount of the optical packet allocated to each wavelength band of the multiplexed optical-packet signal, and transmits the skew-amount detection data to the skew control node 700. The skew control node 700 outputs the skew-amount detection data to the transmitting transceiving node when the traffic in the optical switching network 50 is light. The transmitting transceiving node adjusts the delay amount of the optical packet allocated to each wavelength band of the multiplexed optical-packet signal based on the skew-amount detection data received from the skew control node 700. Consequently, skew occurring in the multiplexed optical-packet signal during transmission can be corrected.

As the skew control node 700 of the optical transmission system according to the second embodiment outputs the skew-amount detection data to the transmitting transceiving node when the traffic is light in the optical switching network 50, the transmitting transceiving node can modify the management table while the system is in operation, whereby accurate skew correction is allowed.

Figure 11:
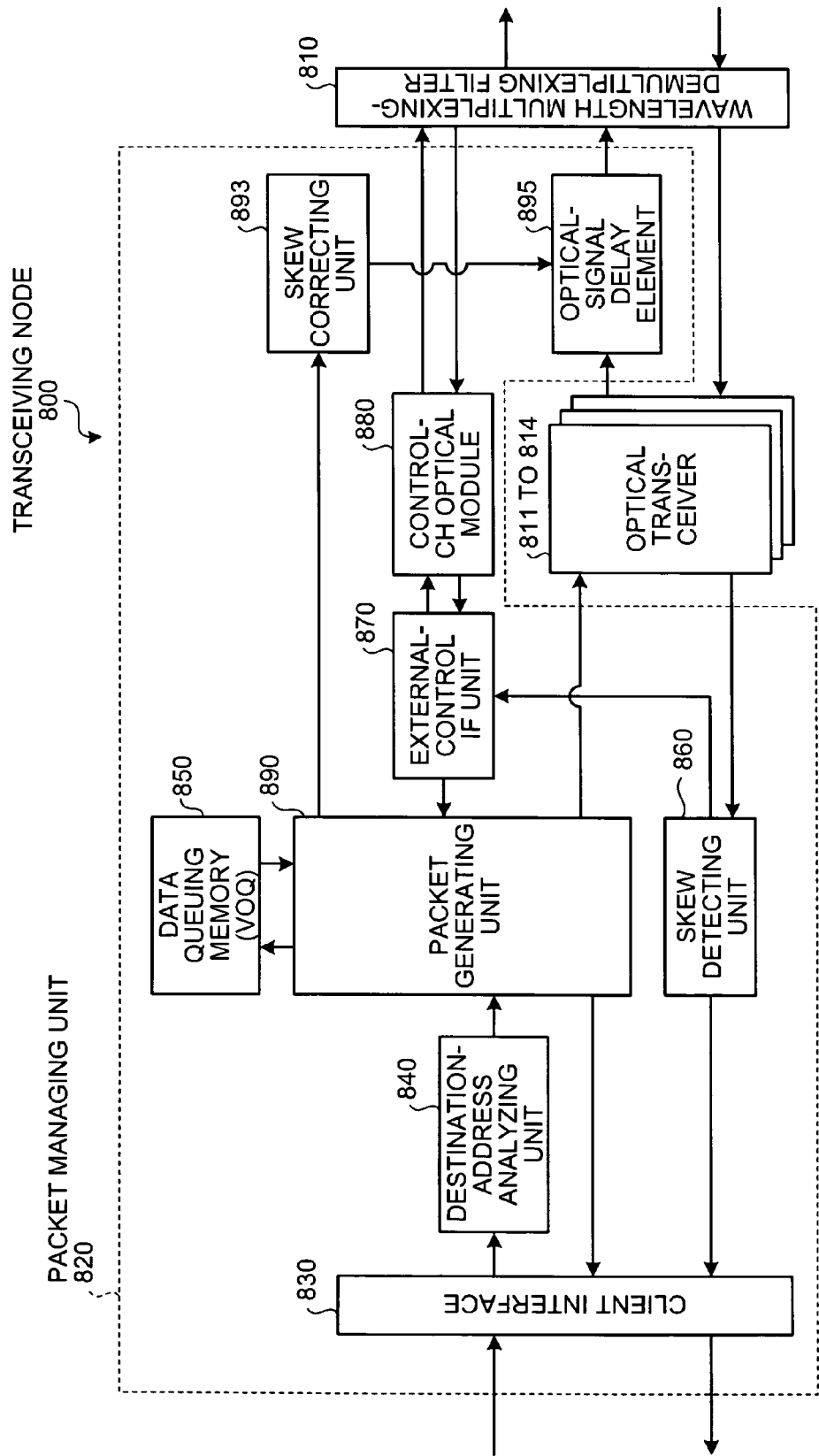
FIG. 11 is a functional block diagram of a transceiving node in which an optical-signal delay element is provided.

In the description with reference to FIG. 8, the electrical-signal delay element 495 is used for skew correction. However, skew correction can also be performed by an optical-signal delay element as shown in FIG. 11. FIG. 11 is a functional block diagram of a transceiving node in which the optical-signal delay element is provided.

As shown in FIG. 11, a transceiving node 800 includes a wavelength multiplexing-demultiplexing filter 810, optical transceivers 811 to 814, and a packet managing unit 820. The wavelength multiplexing-demultiplexing filter 810 and the optical transceivers 811 to 814 are functionally identical to the wavelength multiplexing-demultiplexing filter 410 and the optical transceivers 411 to 414, respectively. Hence, the descriptions thereof are omitted.

The packet managing unit 820 includes a client interface 830, a destination-address analyzing unit 840, a data queuing memory 850, a skew detecting unit 860, an external-control IF unit 870, a control-ch optical module 880, a packet generating unit 890, a skew correcting unit 893, and an optical-signal delay element 895.

The client interface 830, the destination-address analyzing unit 840, the data queuing memory 850, the skew detecting unit 860, the external-control IF unit 870, the control-ch optical module 880, and the packet generating unit 890 are functionally identical, respectively, to the client interface 430, the destination-address analyzing unit 440, the data queuing memory 450, the skew detecting unit 460, the external-control IF unit 470, the control-ch optical module 480, and the packet generating unit 490 shown in FIG. 8. Hence, the descriptions thereof are omitted.

The skew correcting unit 893 controls the optical-signal delay element 895 to adjust the delay amount of the optical packet allocated to each of the wavelength bands corresponding to the wavelengths 1 to 4, based on the management data stored in a storage unit of the packet generating unit 890.

The optical-signal delay element 895 has a plurality of optical transmission channels of different lengths, and delays the optical packet by switching the optical transmission channel over which the optical packet is transmitted. In other words, the optical-signal delay element 895 can delay an optical packet by transmitting the optical packet over a transmission channel which is longer than a reference transmission channel. In response to a control command from the skew correcting unit 893, the optical-signal delay element 895 delays and outputs the optical packets received from the optical transceivers 811 to 814 to the wavelength multiplexing-demultiplexing filter 810.

The transceiving node 100 of the first embodiment shown in FIG. 2 may perform skew correction using the electrical-signal delay element shown in FIG. 8 or the optical-signal delay element shown in FIG. 11.

All the automatic processes explained in the present embodiment can be, entirely or in part, carried out manually. Similarly, all the manual processes explained in the present embodiment can be, entirely or in part, carried out automatically by a known method. The process procedures, the control procedures, specific names, and data, including various parameters mentioned in the description and drawings can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used. The process functions performed by the apparatus can be entirely or partially realized by a CPU or a computer program executed by the CPU or by a hardware using wired logic.

According to the present invention, skew occurring in a wavelength multiplexed signal can be corrected.

According to the present invention, skew amount can be accurately detected.

According to the present invention, skew occurring in a wavelength multiplexed signal during transmission to a destination can be efficiently corrected.

According to the present invention, load on an optical switching network can be reduced as well as the skew occurring in the wavelength multiplexed signal can be corrected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission system that performs optical transmission over an optical switching network, comprising:
   a packet generation circuit that stores data received from a data transmission source on a first memory and generates a plurality of packets based on the data;
   a first transmitter that changes the plurality of packets into a plurality of optical packets;
   an optical wavelength-multiplexer that generates a multiplexed optical packet signal by performing optical wavelength multiplexing on the plurality of optical packets, and transmits the multiplexed optical packet signal to a transmission destination;
   a second transmitter that retransmits the multiplexed optical packet signal transmitted from the optical wavelength-multiplexer back to a the first transmitter;
   a skew-amount detector that detects a skew amount of the optical packet allocated to each wavelength band of the multiplexed optical packet signal retransmitted from the second transmitter; and
   a delay-amount adjuster that adjusts, based on the skew amount detected by the skew-amount detector, a delay amount of an optical packet allocated to each wavelength band of a multiplexed optical packet signal transmitted to a transmission destination by the optical wavelength-multiplexer, wherein
   the packet generation circuit request to the data transmission source for discontinuing data output to the packet generation circuit when the amount of data stored in the first memory exceeds a reference value, and
   the packet generation circuit request to the data transmission source for resuming data output to the packet generation circuit when the amount of data stored in the first memory is less than the reference value.

2. The optical transmission system according to claim 1, wherein each of the optical packets subjected to optical wavelength multiplexing by the optical wavelength-multiplexer includes skew detection data that is taken as a reference for detection of the skew amount,
   the optical wavelength-multiplexer demultiplexes the multiplexed optical packet signal retransmitted from the second transmitter into the optical packets of the respective wavelength bands, and
   the skew amount detector detects the skew amount based on an arrival timing of the skew detection data included in each of the optical packets obtained as a result of demultiplexing.

3. The optical transmission system according to claim 1, further comprising
   a second memory that stores therein skew-amount management data containing the skew amount of each of the optical packets in association with the transmission destination of the optical packet,
   wherein the delay-amount adjuster retrieves, based on the skew-amount management data, the skew amount of each optical packet allocated to each wavelength band of the multiplexed optical packet signal on transmission to the transmission destination, and adjusts the delay amount of the optical packet based on the retrieved skew amount.

4. An optical transmission system that performs optical transmission over an optical switching network, comprising:
   a packet generation circuit that stores data received from a data transmission source on a first memory and generates a plurality of packets based on the data;
   a transmitter that changes the plurality of packets into a plurality of optical packets;
   an optical wavelength-multiplexer that generates a multiplexed optical packet signal by performing optical wavelength multiplexing on the plurality of optical packets, and transmits the multiplexed optical packet signal to a transmission destination;
   a skew-amount detector that detects a skew amount of each of the optical packets allocated to wavelength bands of the multiplexed optical packet signal transmitted from the optical wavelength-multiplexer;
   a skew controller that manages the skew amount detected by the skew-amount detector, and transmits the skew amount to a the transmitter based on a traffic amount in the optical switching network; and
   a delay amount adjuster that adjusts, based on the skew amount transmitted from the skew controller, a delay amount of an optical packet allocated to each wavelength band of a multiplexed optical packet signal transmitted to a transmission destination by the optical wavelength-multiplexer, wherein
   the packet generation circuit request to the data transmission source for discontinuing data output to the packet generation circuit when the amount of data stored in the first memory exceeds a reference value, and
   the packet generation circuit request to the data transmission source for resuming data output to the packet generation circuit when the amount of data stored in the first memory is less than the reference value.

5. The optical transmission system according to claim 4, wherein the skew controller transmits the skew amount to the transmission source of the multiplexed optical packet signal when the traffic amount in the optical switching network is less than a reference value.

6. The optical transmission system according to claim 4, wherein each of the optical packets subjected to optical wavelength multiplexing by the optical wavelength-multiplexer includes skew detection data that is taken as a reference for detection of the skew amount, and
   the optical wavelength-multiplexer demultiplexes the multiplexed optical packet signal into the optical packets of the respective wavelength bands, and
   the skew amount detector detects the skew amount based on an arrival timing of the skew detection data included in each of the optical packets obtained as a result of demultiplexing.

7. The optical transmission system according to claim 4, further comprising
   a second memory that stores therein skew-amount management data containing the skew amount of each of the optical packets in association with the transmission destination of the optical packet,
   wherein the delay-amount adjuster retrieves, based on the skew-amount management data, the skew amount of each optical packet allocated to each wavelength band of the multiplexed optical packet signal on transmission to the transmission destination, and adjusts the delay amount of the optical packet based on the retrieved skew amount.

8. An optical transmission method of an optical transmission system that performs optical transmission over an optical switching network between a transmission source node and a transmission destination node, comprising:
   storing data received from a data transmission source on a first memory;
   generating a plurality of packets based on the data;

changing the plurality of packets into a plurality of optical packets;

optical wavelength-multiplexing in which the transmission source node generates a multiplexed optical packet signal by performing optical wavelength multiplexing on the plurality of optical packets, and transmitting the multiplexed optical packet signal to the transmission destination node;

retransmitting in which the transmission destination node retransmits the multiplexed optical packet signal transmitted in the optical wavelength-multiplexing back to the transmission source node;

skew-amount detecting in which the transmission source node detects a skew amount of the optical packet allocated to each wavelength band of the multiplexed optical packet signal retransmitted in the retransmitting; and delay-amount adjusting in which the transmission source node adjusts, based on the skew amount detected in the skew-amount detecting, a delay amount of an optical packet allocated to each wavelength band of a multiplexed optical packet signal transmitted to the transmission destination node;

requesting to the data transmission source for discontinuing data output when the amount of data stored in the first memory exceeds a reference value, and requesting to the data transmission source for resuming data output when the amount of data stored in the first memory is less than the reference value.

9. The optical transmission method according to claim 8, wherein each of the optical packets subjected to optical wavelength multiplexing includes skew detection data that is taken as a reference for detection of the skew amount, demultiplexing the multiplexed optical packet signal retransmitted from the transmission destination node into the optical packets of the respective wavelength bands, and detecting the skew amount based on an arrival timing of the skew detection data included in each of the optical packets obtained as a result of demultiplexing.

10. The optical transmission method according to claim 8, wherein the transmission source node further includes a second memory that stores therein skew-amount management data containing the skew amount of each of the optical packets in association with a transmission destination of the optical packet, and the delay-amount adjusting retrieves, based on the skew-amount management data, the skew amount of each optical packet allocated to each wavelength band of the multiplexed optical packet signal on transmission to the transmission destination, and adjusts the delay amount of the optical packet based on the retrieved skew amount.

11. An optical transmission method of an optical transmission system that performs optical transmission over an optical switching network between a transmission source node and a transmission destination node, comprising:

storing data received from a data transmission source on a first memory;

generating a plurality of packets based on the data;

changing the plurality of packets into a plurality of optical packets;

optical wavelength-multiplexing in which the transmission source node generates a multiplexed optical packet signal by performing optical wavelength multiplexing on the plurality of optical packets, and transmitting the multiplexed optical packet signal to the transmission destination node;

skew-amount detecting in which the transmission destination node detects a skew amount of each of the optical packets allocated to wavelength bands of the multiplexed optical packet signal transmitted in the optical wavelength-multiplexing;

skew controlling in which a management node that manages the skew amount detected in the skew-amount detecting transmits the skew amount to the transmission source node of the multiplexed optical packet signal based on a traffic amount in the optical switching network;

delay amount adjusting in which the transmission source node adjusts, based on the skew amount transmitted from the management node, a delay amount of an optical packet allocated to each wavelength band of a multiplexed optical packet signal transmitted to the transmission destination node in the optical wavelength-multiplexing;

requesting to the data transmission source for discontinuing data output when the amount of data stored in the first memory exceeds a reference value, and requesting to the data transmission source for resuming data output when the amount of data stored in the first memory is less than the reference value.

12. The optical transmission method according to claim 11, wherein the skew controlling transmits the skew amount to the transmission source node of the multiplexed optical packet signal when the traffic amount in the optical switching network is less than a reference value.

13. The optical transmission method according to claim 11, wherein each of the optical packets subjected to optical wavelength multiplexing in the optical wavelength-multiplexing includes skew detection data that is taken as a reference for detection of the skew amount, and the skew-amount detecting demultiplexes the multiplexed optical packet signal into the optical packets of the respective wavelength bands, and detects the skew amount based on an arrival timing of the skew detection data included in each of the optical packets obtained as a result of demultiplexing.

14. The optical transmission method according to claim 11, further comprising storing in which a second memory stores therein skew-amount management data containing the skew amount of each of the optical packets in association with a transmission destination of the optical packet, wherein the delay-amount adjusting retrieves, based on the skew-amount management data, the skew amount of each optical packet allocated to each wavelength band of the multiplexed optical packet signal on transmission to the transmission destination node, and adjusts the delay amount of the optical packet based on the retrieved skew amount.

* * * * *